United States Patent
Lee

(10) Patent No.: US 9,681,277 B2
(45) Date of Patent: Jun. 13, 2017

(54) METHOD OF TRANSMITTING MESSAGE AND ELECTRONIC DEVICE THEREOF

(71) Applicant: Samsung Electronics Co., Ltd., Gyeonggi-do (KR)

(72) Inventor: Hyun-Jun Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 41 days.

(21) Appl. No.: 14/792,719

(22) Filed: Jul. 7, 2015

(65) Prior Publication Data

US 2016/0057586 A1 Feb. 25, 2016

(30) Foreign Application Priority Data

Aug. 20, 2014 (KR) ........................ 10-2014-0108469

(51) Int. Cl.
*H04W 4/12* (2009.01)
*H04M 3/533* (2006.01)
*H04M 3/53* (2006.01)
*H04M 1/725* (2006.01)

(52) U.S. Cl.
CPC ......... *H04W 4/12* (2013.01); *H04M 1/72519* (2013.01); *H04M 3/5307* (2013.01); *H04M 3/53383* (2013.01); *H04M 3/53391* (2013.01); *H04M 1/72547* (2013.01)

(58) Field of Classification Search
CPC ..... H04W 4/12; H04W 4/10; H04W 36/0022; H04W 36/005; H04W 36/26; H04W 36/30; H04W 76/005; H04W 76/022; H04W 84/08; H04W 48/04; H04W 4/06; H04W 4/16; H04M 1/72563; H04M 3/5307; H04M 1/72519; H04M 1/72547; H04M 3/53383; H04M 3/53391
USPC ........................................................ 455/413
See application file for complete search history.

(56) References Cited

U.S. PATENT DOCUMENTS

| | | | |
|---|---|---|---|
| 8,774,174 B2* | 7/2014 | James | H04M 3/53341 370/353 |
| 2010/0173664 A1* | 7/2010 | Han | H04W 52/50 455/522 |
| 2010/0311396 A1* | 12/2010 | Kim | H04M 3/42195 455/414.1 |
| 2011/0077012 A1* | 3/2011 | Lee | H04M 1/006 455/445 |
| 2012/0208485 A1* | 8/2012 | Kim | H04M 3/5116 455/404.1 |
| 2014/0118465 A1* | 5/2014 | Scott | H04M 1/72519 348/14.03 |
| 2014/0169539 A1* | 6/2014 | Mumick | H04M 3/48 379/88.23 |

(Continued)

FOREIGN PATENT DOCUMENTS

JP 2000-165947 A 6/2000

*Primary Examiner* — Hirdepal Singh
(74) *Attorney, Agent, or Firm* — Cha & Reiter, LLC.

(57) ABSTRACT

Disclosed are an electronic device and a method for transmitting a message. A method of operating an electronic device may include: determining by a processor whether a call with a counterpart electronic device is possible; and transmitting a call wish message through a communication network to the counterpart electronic device when the call is not possible based on a result of the determination.

20 Claims, 12 Drawing Sheets

(56) References Cited

U.S. PATENT DOCUMENTS

| | | | |
|---|---|---|---|
| 2015/0024715 A1* | 1/2015 | Kwon | H04M 1/72547 455/412.1 |
| 2015/0189100 A1* | 7/2015 | Wang | H04M 3/42195 455/414.1 |
| 2015/0281439 A1* | 10/2015 | Dudai | H04M 3/48 455/414.1 |

* cited by examiner

METHOD OF TRANSMITTING MESSAGE AND ELECTRONIC DEVICE THEREOF

CLAIM OF PRIORITY

This application claims priority under 35 U.S.C. §119(a) to Korean Application Serial No. 10-2014-0108469, which was filed in the Korean Intellectual Property Office on Aug. 20, 2014, the entire content of which is hereby incorporated by reference.

BACKGROUND

1. Technical Field

The present disclosure relates to a method of transmitting a message and an electronic device thereof and, more particularly, to an apparatus and a method for transmitting a message for a call connection.

2. Description of the Related Art

When, in a state a first electronic device (TX) transmits a call and a second electronic device (RX) receives the call, the second electronic device (RX) does not accept a call connection with the first electronic device (TX), the first electronic device (TX) may transmit a voice message or contact information to a server, and the server may transmit the received voice message or contact information to the second electronic device (RX).

SUMMARY

According to various embodiments of the present disclosure, when a call connection between a first electronic device (TX) having transmitted a call and a second electronic device (RX) having received the call (for example, a counterpart electronic device) is not made, the first electronic device (TX) may transmit a message for the call connection to the second electronic device.

For example, the first electronic device (TX) may transmit a call wish message including identification information (for example, a sender's name) of a sender of the first electronic device (TX) or current situation information (for example, emergency situation) of the sender to the second electronic device (RX).

In accordance with an aspect of the present disclosure, an electronic device is provided. The electronic device may include: a communication interface; and a processor functionally connected to the communication interface, wherein the processor determines whether a call with a counterpart electronic device is possible, and transmits a call wish message through a communication network to the counterpart electronic device when the call is not possible. For example, when the processor determines that a call with a counterpart electronic device is possible, the processor may transmit the call when possible. Also for example, when the call is not possible, instead of transmitting the call, the processor may instead transmit a call wish message to the counterpart electronic device.

The processor may determine that the call with the counterpart electronic device is not possible based on at least one detection of the following: (a) no answer or reply from the counterpart electronic device; (b) call connection rejection; (c) abnormal call end after a call connection; and/or (d) power off.

The processor may transmit the call wish message to the counterpart electronic device based on a user input. The processor may load a message transmission mode for transmitting the call wish message to the counterpart electronic device. When the call with the counterpart electronic device is not possible, the processor may successively transmit the call wish message to the counterpart electronic device a predetermined number of times. The processor may transmit at least one of a call wish message written by a user input and a pre-stored call wish message to the counterpart electronic device. History information in the electronic device, and history information on reception of the call wish message may be displayed as call information in the counterpart electronic device. The processor may re-transmit the call wish message according to at least one of a predetermined time interval and a number of times of the call wish message. The call wish message may include at least some of a user profile set to the electronic device. The call wish message may include at least some of a user profile set to the electronic device.

In accordance with another aspect of the present disclosure, a method of operating an electronic device is provided. The method includes: the method comprising: determining, by a processor, whether a call with a counterpart electronic device is possible; and transmitting a call wish message through a communication network to the counterpart electronic device when the call is not possible based on a result of the determination. Transmitting the call wish message may include transmitting the call wish message to the counterpart electronic device based on a user input. The method may further include loading a message transmission mode for transmitting the call wish message to counterpart electronic device. The call wish message may include at least some of a user profile set to the electronic device.

Determining whether the call with the counterpart electronic device may include determining that the call is not possible based on at least one detection of: (a) no answer or reply from the counterpart electronic device; (b) call connection rejection; (c) abnormal call end after a call connection; and (c) power off. The transmitting of the call wish message may include transmitting the call wish message to the counterpart electronic device based on a user input. The transmitting of the call wish message may include transmitting, successively for a predetermined number of times, the call wish message to the counterpart electronic device when the call with the counterpart electronic device is not possible. The transmitting of the call wish may include transmitting the call wish message to the counterpart electronic device based on a group predetermined according to identification information of the counterpart electronic device. The transmitting of the call wish message may include transmitting at least one of a call wish message written by a user input and a pre-stored call wish message to the counterpart electronic device. The call wish message may be re-transmitted according to at least one of a predetermined time interval and a number of times of the call wish message.

History information pertaining to the transmitting of the call wish message is displayed as call information in the electronic device, and history information on reception of the call wish message is displayed as call information in the counterpart electronic device.

According to various embodiments of the present disclosure, when a call connection between a first electronic device (TX) having transmitted a call and a second electronic device (RX) having received the call (for example, a counterpart electronic device) is not made, the first electronic device (TX) may transmit a call wish message to the second electronic device, so as to provide an efficient communication interface.

These and other aspects of the present disclosure are more fully described herein below with reference to the accompanying drawings.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
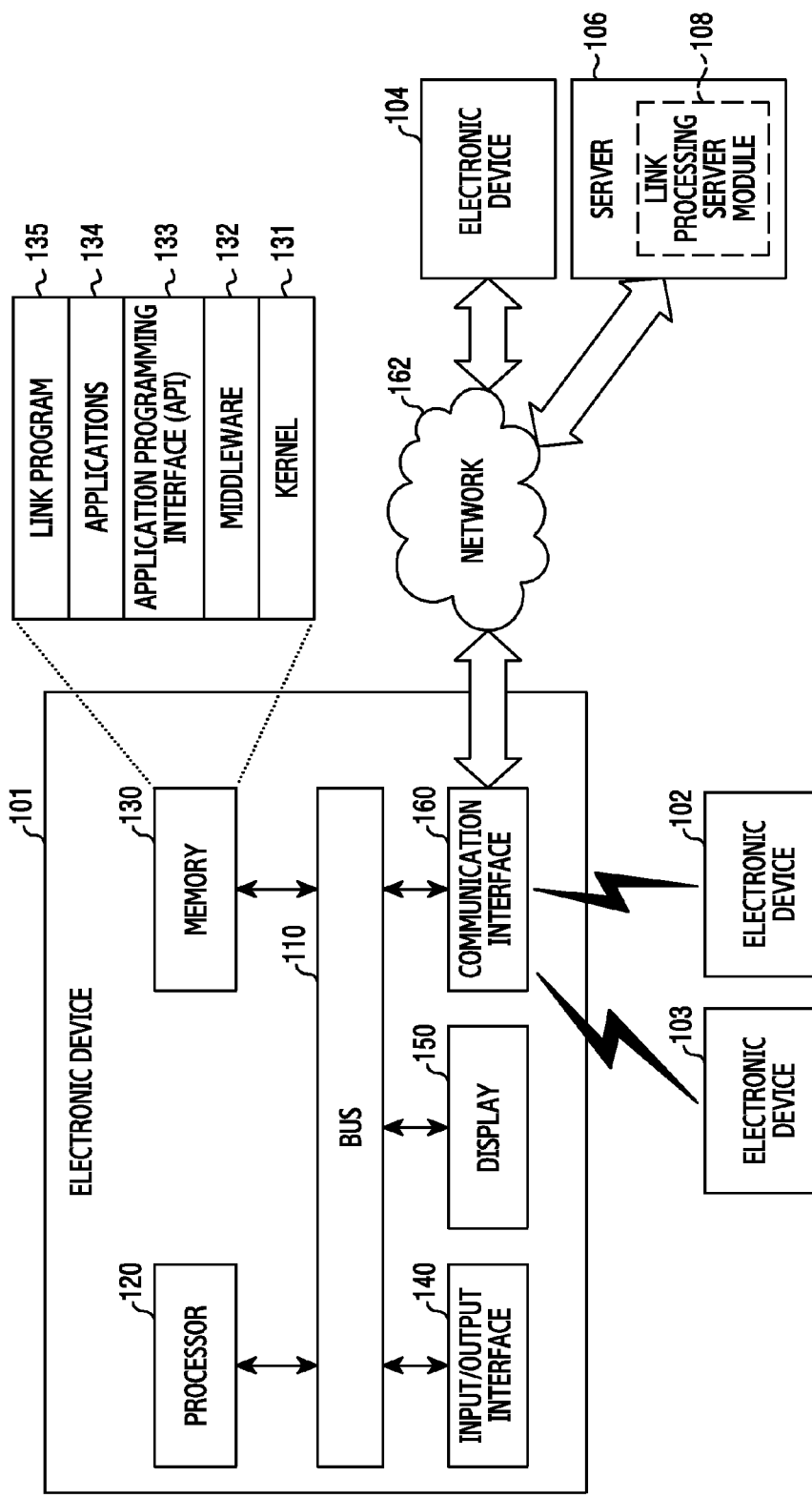
FIG. 1 illustrates a network environment including an electronic device according to various embodiments of the present disclosure.

Hereinafter, various embodiments of the present disclosure will be described with reference to the accompanying drawings.

The present disclosure may have various embodiments, and modifications and changes may be made therein. Therefore, the present disclosure will be described in detail with reference to particular embodiments shown in the accompanying drawings. However, it should be understood that there is no intent to limit the present disclosure to the particular forms disclosed herein; rather, the present disclosure should be construed to cover all modifications, equivalents, and/or alternatives falling within the spirit and scope of the disclosure. In the description of the drawings, similar reference numerals may be used to designate similar elements.

As used in various embodiments of the present disclosure, the expressions "include", "may include" and other conjugates refer to the existence of a corresponding disclosed function, operation, or constituent element, and do not limit one or more additional functions, operations, or constituent elements. Further, as used in various embodiments of the present disclosure, the terms "include", "have", and their conjugates are intended merely to denote a certain feature, numeral, step, operation, element, component, or a combination thereof, and should not be construed to initially exclude the existence of or a possibility of addition of one or more other features, numerals, steps, operations, elements, components, or combinations thereof.

Further, as used in various embodiments of the present disclosure, the expression "or" includes any or all combinations of words enumerated together. For example, the expression "A or B" or "at least A or/and B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, without departing from the scope of the present disclosure, a first component element may be named a second component element. Similarly, the second component element also may be named the first component element.

When an element is referred to as being "coupled" or "connected" to any other element, it should be understood that not only the element may be coupled or connected directly to the other element, but also a third element may be interposed therebetween. Contrarily, when an element is referred to as being "directly coupled" or "directly connected" to any other element, it should be understood that no element is interposed therebetween.

The terms as used in various embodiments of the present disclosure are used merely to describe a certain embodiment and are not intended to limit the present disclosure. As used herein, singular forms may include plural forms as well unless the context explicitly indicates otherwise. Further, all terms used herein, including technical and scientific terms, have the same meaning as commonly understood by those of skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in various embodiments of the present disclosure.

An electronic device according to various embodiments of the present disclosure may be a device including a communication interface 106. The electronic device according to various embodiments of the present disclosure may, for example, include at least one of a smart phone, a tablet personal compute (PC), a mobile phone, a video phone, an e-book reader, a desktop PC, a laptop PC, a netbook computer, a personal digital assistant (PDA), a portable multimedia player (PMP), an MP3 player, a mobile medical device, a camera, a wearable device (e.g., a head-mountdevice (HMD) such as electronic glasses, electronic clothing, an electronic bracelet, an electronic necklace, an electronic appcessory, an electronic tattoo, or a smart watch), a television, a digital video disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an artificial intelligence robot, a Television (TV), an electronic dictionary, an electronic key, a camcorder, medical equipment (e.g., a magnetic resonance angiography (MRA) machine, a magnetic resonance imaging (MRI) machine, a computed tomography (CT) scanner, or an ultrasonic machine), a navigation device, a global positioning system (GPS) receiver, an event data recorder (EDR), a flight data recorder (FDR), a vehicle infotainment device, electronic equipment for a ship (e.g., ship navigation equipment and a gyrocompass), avionics, security equipment, an industrial or home robot, a part of furniture or building/structure, an electronic board, an electronic signature receiving device, a projector, and various measuring instruments (e.g., a water meter, an electricity meter, a gas meter, or a wave meter), each of which may include an electronic device according to embodiments of the present disclosure may be a device including a communication function.

The electronic device according to various embodiments of the present disclosure may be a combination of one or more of the aforementioned various devices. Further, the electronic device according to various embodiments of the present disclosure may be a flexible device. Further, it will be apparent to those skilled in the art that the electronic device according to various embodiments of the present disclosure is not limited to the above-mentioned devices.

Hereinafter, an electronic device according to various embodiments of the present disclosure will be described with reference to the accompanying drawings. The term "user" as used in various embodiments of the present disclosure may indicate a person who uses an electronic device or a device (e.g., artificial intelligence electronic device) that uses an electronic device.

FIG. 1 illustrates a network environment including an electronic device according to various embodiments of the present disclosure. Referring to FIG. 1, the electronic device 101 may include at least one of a bus 110, a processor 120, a memory 130, an input/output interface 140, a display 150, and/or a communication interface 160. The bus 110 may be a circuit that connects the aforementioned elements to each other and transmits communication signals (for example, control messages) between the aforementioned elements.

The processor 120 may, for example, receive commands from the above-mentioned other elements (for example, the memory 130, the input/output interface 140, the display 150, and the communication interface 160) via the bus 110, interpret the received commands, and/or perform calculations or data processing according to the interpreted commands. One or more processors 120 may be included in the electronic device 101 to perform a predetermined function of the electronic device 101.

According to an embodiment, the processor 120 may include one or more Application Processors (APs) and one or more Micro Control Unit (MCUs). According to another embodiment, the processor 120 may include one or more micro controllers as applications or may be functionally connected to one or more micro controllers.

In FIG. 1, the AP and the MCU may be included in one IC package, or may be separately configured to be included in different IC packages, respectively. According to an embodiment, the MCU may be included in an IC package of the AP to be configured as one IC package. Although the processor 120 may include the AP or the MCU in FIG. 2, it is only one embodiment of the present disclosure. It is to be understood that the processor 120 may also perform operations of the AP and/or the MCU.

The AP may drive an operating system or an application program so as to control a plurality of hardware or via the execution of software components connected to the AP, and may process various pieces of data including multimedia data and perform calculations. The AP may be implemented by, for example, a System on Chip (SoC). According to an embodiment, the processor 120 may further include a Graphic Processing Unit (GPU) (not illustrated).

The MCU may be a processor configured to perform a predetermined operation. According to an embodiment, the MCU may acquire sensing information through one or more specified motion sensors (for example, gyro sensor, acceleration sensor, or geomagnetic sensor), compare the acquired sensing information, and determine the operational state of the specified motion sensors with reference to a database of the electronic device 101.

According to an embodiment, the AP or the MCU may load a command or data received from at least one of a non-volatile memory or other components connected to each of the AP and the MCU in a volatile memory, and may process the loaded command or data. Further, the AP or the CP may store data received from or generated by at least one of the other components in a non-volatile memory.

The memory 130 (for example, a memory 230) may store commands or data received from or generated by the processor 120 or other components (for example, the input/output interface 140, the display 150, and the communication interface 160). The memory 130 may include programming modules, for example, a kernel 131, middleware 132, an Application Programming Interface (API) 133, applications 134, or the like. Each of the programming modules may be formed of software, firmware, or hardware, or a combination of two or more thereof.

The kernel 131 may control or manage the remaining programming modules, for example, system resources (for example, the bus 110, the processor 120, or the memory 130) used for executing operations or functions implemented in the middleware 132, the API 133, or the applications 134. Also, the kernel 131 may provide an interface by which the middleware 132, the API 133, or the applications 134 may access individual components of the electronic device 101 to control or manage them.

The middleware 132 may perform a relay function, which may allow the API 133 or the applications 134 to communicate with and exchange data with the kernel 131. Furthermore, with regard to task requests received from the applications 134, the middleware 132 may perform a control (for example, scheduling or load balancing) for the task requests using, for example, a method of assigning a priority, by which the system resources (for example, the bus 110, the processor 120, or the memory 130) of the electronic device 101 may be preferentially used, to at least one of the applications 134.

The API 133 is an interface used by the applications 134 to control a function provided from the kernel 131 or the middleware 132. The API 133 may include, for example, at least one interface or function, for example, an instruction, for a file control, a window control, image processing, a character control, or the like.

The applications 134 may include a short message service (SMS)/multimedia message service (MMS) application, an e-mail application, a calendar application, an alarm application, a health care application (for example, application for monitoring physical activity or blood glucose), and an environmental information application (for example, application for providing atmospheric pressure, humidity, or temperature information). The application 134 may correspond to an application associated with information exchange between the electronic device 101 and an external electronic device (for example, the electronic device 102 or the electronic device 104).

The application related to the information exchange may include, for example, a notification transmission application for transferring predetermined information to an external electronic device or a device management application for managing an external electronic device. The notification relay application may, for example, include a function of transferring, to an external electronic device (for example, the electronic device 104), notification information generated by other applications (for example, an SMS/MMS application, an e-mail application, a health management application, or an environmental information application) of the electronic device 101.

Additionally or alternatively, the notification relay application may receive notification information from, for example, the external electronic device (for example, the electronic device 104) and provide the received notification information to a user. For example, the device management application may manage (for example, install, delete, or update) functions for at least a part of the external electronic device (for example, the electronic device 104) communicating with the electronic device 101 (for example, turning on/off the external electronic device itself (or some elements thereof) or adjusting the brightness (or resolution) of a display), applications operating in the external electronic device, or services (for example, a telephone call service or a message service) provided from the external electronic device.

According to various embodiments, the applications 134 may include an application designated according to attributes (for example, the type of electronic device) of the external electronic device (for example, the electronic device 102 or the electronic device 104). For example, when the external electronic device is an MP3 player, the applications 134 may include an application related to the reproduction of music. Similarly, when the external electronic device is a mobile medical appliance, the applications 134 may include an application related to health care.

According to an embodiment, the applications 134 may include at least one of an application designated to the electronic device 101 and an application received from the external electronic device (for example, a server 106 or the electronic device 104). A link program 135 may be provided with or included in the applications 134, or may be stored in the memory 130 as a separate program.

The link program 135 may identify a call inability state of a counterpart electronic device having received a call (for example, a call connection request) through the communication interface and transmit a call wish message to the counterpart electronic device. The link program 135 may identify the call inability state of the counterpart electronic device having transmitted the call based on at least one state of no answer of the counterpart electronic device, call connection rejection of the counterpart electronic device, abnormal call end after the counterpart electronic device accepts a call connection, and power off of the counterpart electronic device 102.

According to an embodiment, the link program 135 may transmit the call wish message to the counterpart electronic device based on a user input. According to an embodiment, the link program 135 may load a call wish message transmission mode based on a user input. According to an embodiment, when the number of occurrences of the call inability state meets a predetermined number, the link program 135 may transmit the call wish message to the counterpart electronic device.

According to an embodiment, the link program 135 may automatically determine the call wish message in accordance with a group designated to information of the counterpart electronic device. According to an embodiment, the link program 135 may determine a call wish message selected from two or more provided messages or written based on a user input.

According to an embodiment, the link program 135 may display information on the transmission of the call wish message in call state information of at least one of the electronic device and the counterpart electronic device. According to an embodiment, the link program 135 may re-transmit the call wish messages for a predetermined number of times at a time interval designated to setting information. According to an embodiment, the link program 135 may insert at least some of the user profile set (e.g., information from the user profile) to the electronic device into the call wish message.

The input/output interface 140 may transfer a command or data input by a user through an input/output device (for example, various sensors such as an acceleration sensor and a gyro sensor and/or a device such as a keyboard or a touch screen) to the processor 120, the memory 130, the communication interface 160 through, for example, the bus 110. For example, the input/output interface 140 may provide the processor 120 with data corresponding to a touch of the user received as input through a touch screen.

Further, the input/output interface 140 may output a command or data, received from, for example, the processor 120, the memory 130, and/or the communication interface 160 via the bus 110, through an output unit (for example, speaker or display). For example, the input/output interface 140 may output voice data processed by the processor 120 to the user through a speaker.

The display 150 may display various pieces of information (for example, multimedia data, text data or the like.) to a user. Further, the display 150 may include a touch screen for receiving a command through a touch or a proximity touch on the display by an input means.

The communication interface 160 (for example, a communication module 220) may establish a communication connection between the electronic device 101 and an external device (for example, the electronic device 104 or the server 106). For example, the communication interface 160 may be connected to the network 162 through wireless communication or wired communication, and may communicate with an external device.

The wireless communication may include at least one of, for example, Wi-Fi, Bluetooth (BT), Near Field Communication (NFC), Global Positioning System (GPS) and cellular communication (for example LTE, LTE-A, CDMA, WCDMA, UMTS, WiBro, GSM, etc.). The wired communication may include at least one of, for example, a Universal Serial Bus (USB), a High Definition Multimedia Interface (HDMI), a Recommended Standard 232 (RS-232), and a Plain Old Telephone Service (POTS).

According to an embodiment, the network 162 may be a communication network. The communication network may include at least one of a computer network, the Internet, the Internet of things, and a telephone network. According to an embodiment, a protocol (for example, a transport layer protocol, data link layer protocol, or a physical layer protocol) for communication between the electronic device 101 and the external device may be supported by at least one of the application 134, the application programming interface 133, the middleware 132, the kernel 131, and the communication interface 160.

According to an embodiment, the server 106 may support the driving of the electronic device 101 by performing at least one operation (or function) implemented in the electronic device 101. For example, the server 106 may include the processor 120 for controlling the electronic device 101 to perform various embodiments of the present disclosure or a server module (for example, a server controller or a server processor (not shown)), which can support a specific module configured to perform various embodiments.

For example, the server module may include at least one element of the processor 120 or the specific module to perform at least one operation of the operations performed by the processor 120 or the specific module (for example, perform the operation on behalf of the processor 120 or the specific module). According to various embodiments, the server module may be a link processing server module 108 of FIG. 1. Additional information on the electronic device 101 will be provided through FIGS. 2 to 12 below.

Figure 2:
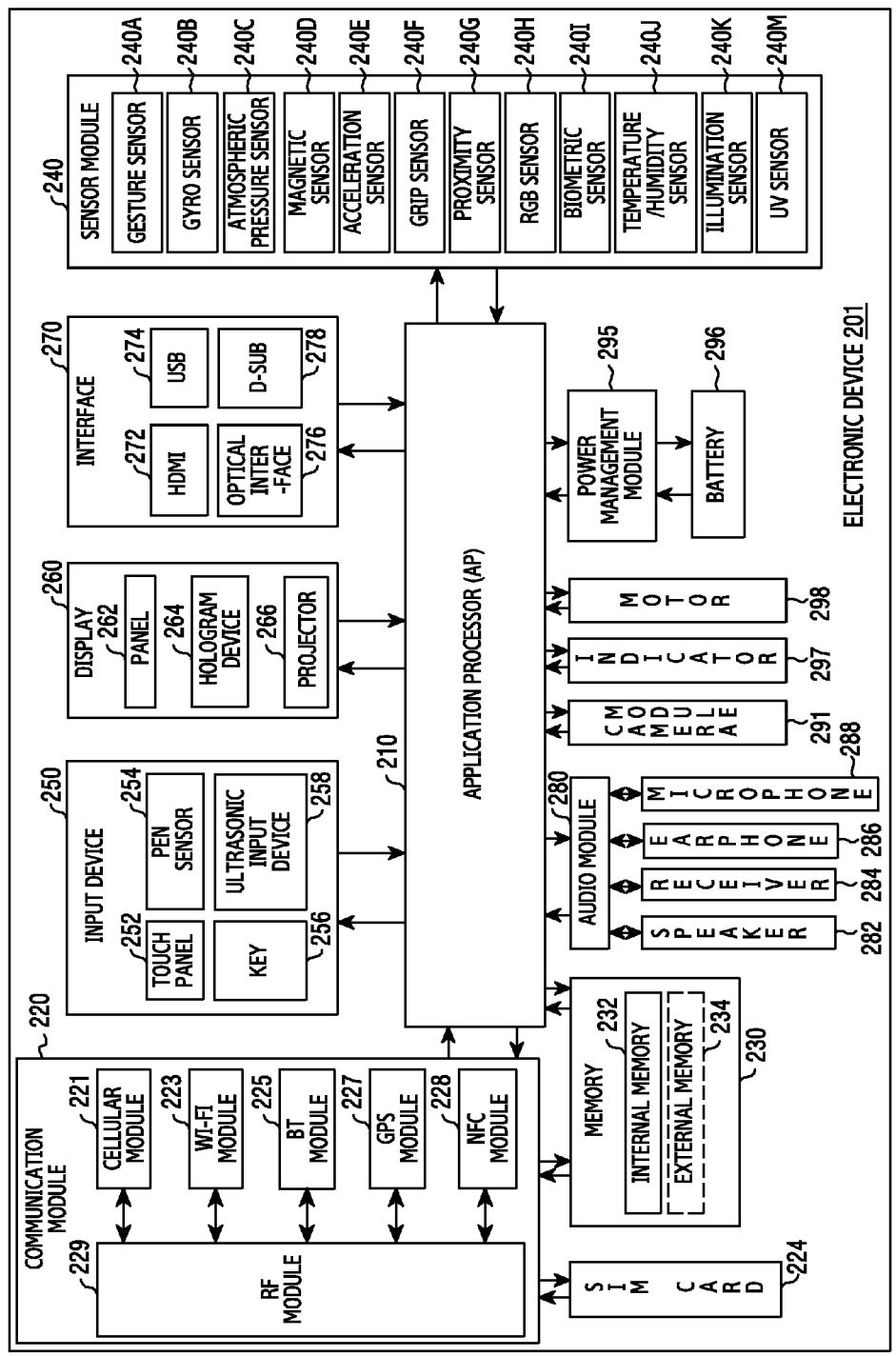
FIG. 2 is a block diagram of an electronic device according to various embodiments of the present disclosure.

FIG. 2 is a block diagram of an electronic device according to various embodiments of the present disclosure. The electronic device 201 may constitute, for example, all or some of the electronic device 101 illustrated in FIG. 1, or expand all or some of the components of the electronic device 101. Referring to FIG. 2, the electronic device 201 may include at least one Application Processor (AP) 210, a communication module 220, a Subscriber Identifier Module (SIM) card 224, a memory 230, a sensor module 240, an input device 250, a display 260, an interface 270, an audio module 280, a camera module 291, a power management module 295, a battery 296, an indicator 297, and/or a motor 298.

One or more processors 210 may be included in the electronic device 101 to perform a predetermined function of the electronic device 101. According to an embodiment, the processor 210 may include one or more Application Processors (APs) and one or more Micro Control Unit (MCUs). According to another embodiment, the processor 210 may include one or more micro controllers as applications or may be functionally connected to one or more micro controllers.

In FIG. 1, the AP and the MCU may be included in one IC package, or may be separately configured to be included in different IC packages, respectively. According to an embodiment, the MCU may be included in an IC package of the AP to be configured as one IC package. Although the processor 210 includes the AP or the MCU in FIG. 2, it is only an embodiment for clear understanding, but it is obvious that the processor 210 may also perform operations of the AP and/or the MCU.

The AP may drive an operating system or an application program so as to control a plurality of hardware or software components connected to the AP, and may process various pieces of data including multimedia data and perform calculations. The AP may be implemented by, for example, a System on Chip (SoC). According to an embodiment, the processor 210 may further include a Graphic Processing Unit (GPU) (not illustrated).

The MCU may be a processor configured to perform a predetermined operation. According to an embodiment, the MCU may acquire sensing information through one or more predetermined motion sensors (for example, a gyro sensor 240B, an acceleration sensor 240E, or a geomagnetic sensor 140P), compare acquired sensing information, and determine an operation state of the predetermined sensor (for example, the geomagnetic sensor 140P) with reference to a database of the electronic device 101.

Further, although the MCU and the components of the sensor module 240 are illustrated as separate components in FIG. 2, the MCU may be implemented to include at least some of the components of the sensor module 240 (for example, at least one of the gyro sensor 240B, the acceleration sensor 240E, and the geomagnetic sensor 140P). According to an embodiment, the AP or the MCU may load a command or data received from at least one of a non-volatile memory and other components connected to each of the AP and the MCU in a volatile memory, and may process the loaded command or data. Further, the AP or the CP may store data received from or generated by at least one of the other components in a non-volatile memory.

The communication module 220 (for example, the communication interface 160) may perform data transmission/reception in communication between the electronic device 101 and other electronic devices (for example, the electronic device 102, the electronic device 104, or the server 106) connected thereto through a network. According to an embodiment, the communication module 220 may include a cellular module 221, a Wi-Fi module 223, a BT module 225, a GPS module 227, an NFC module 228, and/or a Radio Frequency (RF) module 229.

The cellular module 221 may provide a voice, a call, a video call, a text message service, or an Internet service through a communication network (for example, Long Term Evolution (LTE), LTE-A, Code Division Multiple Access (CDMA), Wideband CDMA (WCDMA), Universal Mobile Telecommunication System (UMTS), Wireless Broadband (WiBro), or Global System for Mobile communication (GSM)). Furthermore, the cellular module 221 may distinguish between and authenticate electronic devices within a communication network by using, for example, a subscriber identification module (for example, the SIM card 224). According to an embodiment, the cellular module 221 may perform at least some of the functions that the AP 210 may provide. For example, the cellular module 221 may perform at least some of the multimedia control functions.

According to an embodiment of the present disclosure, the cellular module 221 may include a communication processor (CP). Furthermore, the cellular module 221 may be implemented by, for example, an SoC. Although the components such as the cellular module 221 (for example, the communication processor), the memory 230, and the power management module 295 are illustrated as components separated from the AP 210 in FIG. 2, the AP 210 may include at least some of the aforementioned components (for example, the cellular module 221) in an embodiment.

According to an embodiment, the AP 210 or the cellular module 221 (for example, the communication processor) may load a command or data received from at least one of a non-volatile memory and other components connected thereto into a volatile memory and process the loaded command or data. Further, the AP 210 or the cellular module 221 may store data received from or generated by at least one of other components in a non-volatile memory.

For example, each of the Wi-Fi module 223, the BT module 225, the GPS module 227, and the NFC module 228 may include a processor for processing data transmitted/received through the corresponding module. Although the cellular module 221, the WiFi module 223, the BT module 225, the GPS module 227, and the NFC module 228 are illustrated as separate blocks in FIG. 2, at least some (for example, two or more) of the cellular module 221, the WiFi module 223, the BT module 225, the GPS module 227, and the NFC module 228 may be included in one Integrated Chip (IC) or one IC package in one embodiment. For example, at least some (for example, the communication processor corresponding to the cellular module 221 and the WiFi processor corresponding to the WiFi module 223) of the processors corresponding to the cellular module 221, the WiFi module 223, the BT module 225, the GPS module 227, and the NFC module 228 may be implemented as one SoC.

The RF module 229 may transmit/receive data, for example, RF signals. Although not illustrated in the drawing, the RF module 229 may, for example, include a transceiver, a Power Amp Module (PAM), a frequency filter, a Low Noise Amplifier (LNA), or the like. Further, the RF module 229 may further include a component for transmitting/receiving electronic waves over a free air space in wireless communication, for example, a conductor, a conducting wire or the like. Although the cellular module 221, the Wi-Fi module 223, the BT module 225, the GPS module 227, and the NFC module 228 share one RF module 229 in FIG. 2, at least one of the cellular module 221, the Wi-Fi module 223, the BT module 225, the GPS module 227, and the NFC module 228 may transmit/receive an RF signal through a separate RF module in one embodiment.

The SIM card 224 may be a card including a subscriber identification module, and may be inserted into a slot formed in a predetermined portion of the electronic device. The SIM card 224 may include unique identification information (for example, an integrated circuit card identifier (ICCID)) or subscriber information (for example, an international mobile subscriber identity (IMSI)).

The memory 230 (for example, the memory 130) may include an internal memory 232 or an external memory 234. The internal memory 232 may include at least one of a volatile memory (for example, a Dynamic Random Access Memory (DRAM), a Static RAM (SRAM), a Synchronous Dynamic RAM (SDRAM), or the like) or a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, or the like).

According to an embodiment, the internal memory 232 may be a Solid State Drive (SSD). The external memory 234 may further include a flash drive, for example, a Compact Flash (CF), a Secure Digital (SD), a Micro Secure Digital (Micro-SD), a Mini Secure Digital (Mini-SD), an extreme Digital (xD), a memory stick, or the like. The external memory 234 may be functionally connected to the electronic device 201 through various interfaces. According to an embodiment, the electronic device 201 may further include a storage device (or storage medium) such as a hard drive.

The sensor module 240 measures a physical quantity or senses an operation state of the electronic device 201, and converts the measured or sensed information into an electric signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, an RGB sensor 240H, a biometric sensor 240I, a temperature/humidity sensor 240J, an illumination sensor 240K, and an Ultra Violet (UV) sensor 240M. Additionally or alternatively, the sensor module 240 may, for example, include an E-nose sensor (not shown), an electromyography (EMG) sensor (not shown), an electroencephalogram (EEG) sensor (not shown), an electrocardiogram (ECG) sensor (not shown), an Infrared (IR) sensor (not shown), an iris sensor (not shown), a fingerprint sensor (not shown), and the like. The sensor module 240 may further include a control circuit for controlling one or more sensors included therein.

The input device 250 may include a touch panel 252, a (digital) pen sensor 254, a key 256, or an ultrasonic input device 258. The touch panel 252 may detect a touch input in at least one of, for example, a capacitive type, a resistive type, an infrared type, and an acoustic wave type. The touch panel 252 may further include a control circuit. The capacitive type touch panel may detect a physical contact or proximity. The touch panel 252 may further include a tactile layer. In this case, the touch panel 252 may provide a user with a tactile reaction.

The (digital) pen sensor 254 may be implemented by, for example, using a method identical or similar to a method of receiving a touch input of a user, or using a separate recognition sheet. The key 256 may include, for example, a physical button, an optical key, or a keypad. The ultrasonic input device 258 is a device, which may identify data by detecting an acoustic wave with a microphone (for example, a microphone 288) of the electronic device 201 through an input unit generating an ultrasonic signal, and may perform wireless detection. According to an embodiment, the electronic device 201 may also receive a user input from an external device (for example, a computer or server) connected thereto by using the communication module 220.

The display 260 (for example, the display 150) may include a panel 262, a hologram device 264, or a projector 266. For example, the panel 262 may be, for example, a Liquid Crystal Display (LCD), an Active Matrix Organic Light Emitting Diode (AM-OLED), or the like. The panel 262 may be implemented to be, for example, flexible, transparent, or wearable. The panel 262 may be implemented by a single module together with the touch panel 252. The hologram device 264 may show a three dimensional image in the air by using an interference of light. The projector 266 may display an image by projecting light onto a screen. The screen may be located, for example, inside or outside the electronic device 201. According to an embodiment, the display 260 may further include a control circuit for controlling the panel 262, the hologram device 264, or the projector 266.

The interface 270 may include, for example, a High-Definition Multimedia Interface (HDMI) 372, a Universal Serial Bus (USB) 274, an optical interface 276, or a D-sub-miniature (D-sub) 278. The interface 270 may be included in, for example, the communication interface 160 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bidirectionally convert a sound and an electrical signal. At least some components of the audio module 280 may be included in, for example, the input/output interface 140 illustrated in FIG. 1. The audio module 280 may process voice information input or output through, for example, a speaker 282, a receiver 284, earphones 286, or the microphone 288. The camera module 291 is a device that may photograph still and moving images, and may include one or more image sensors (for example, a front sensor or a rear sensor, not shown), a lens (not shown), an image signal processor (ISP) (not shown), or a flash (for example, an LED or a xenon lamp, not shown) according to an embodiment.

The power management module 295 may manage power of the electronic device 201. Although not illustrated, the power management module 295 may include, for example, a Power Management Integrated Circuit (PMIC), a charger Integrated Circuit (IC), or a battery or fuel gauge. According to various embodiments, the PMIC may be mounted within an integrated circuit or an SoC semiconductor. Charging methods may be classified into a wired charging method and a wireless charging method. The charger IC may charge a battery and may prevent an overvoltage or excess current from being induced or flowing from a charger.

According to an embodiment, the charger IC may include a charger IC for at least one of the wired charging and the wireless charging. Examples of the wireless charging may include magnetic resonance charging, magnetic induction charging, and electromagnetic charging, and an additional circuit such as a coil loop, a resonance circuit, and a rectifier may be added for the wireless charging.

The battery gauge may measure, for example, a residual quantity of the battery 296, and a voltage, a current, or a temperature during the charging. The battery 296 may store or generate electricity and may supply power to the electronic device 201 using the stored or generated electricity. The battery 296 may include, for example, a rechargeable battery or a solar battery.

The indicator 297 may display a specific state of the electronic device 201 or a part thereof (for example, the AP 210), for example, a boot-up state, a message state, or a state of charge (SOC). The motor 298 may convert an electrical signal into a mechanical vibration. Although not illustrated, the electronic device 201 may include a processing device (for example, a GPU) for supporting mobile TV. The processing unit for supporting mobile TV may process, for example, media data pursuant to a certain standard of Digital Multimedia Broadcasting (DMB), Digital Video Broadcasting (DVB), or media flow.

Each of the above-described elements of the electronic device according to various embodiments of the present disclosure may include one or more components, and the name of a corresponding element may vary according to the type of electronic device. The electronic device according to various embodiments of the present disclosure may include at least one of the above-described elements and may exclude some of the elements or further include other additional elements. Further, some of the elements of the electronic device according to various embodiments of the present disclosure may be coupled to form a single entity while performing the same functions as those of the corresponding elements before the coupling.

Figure 3:
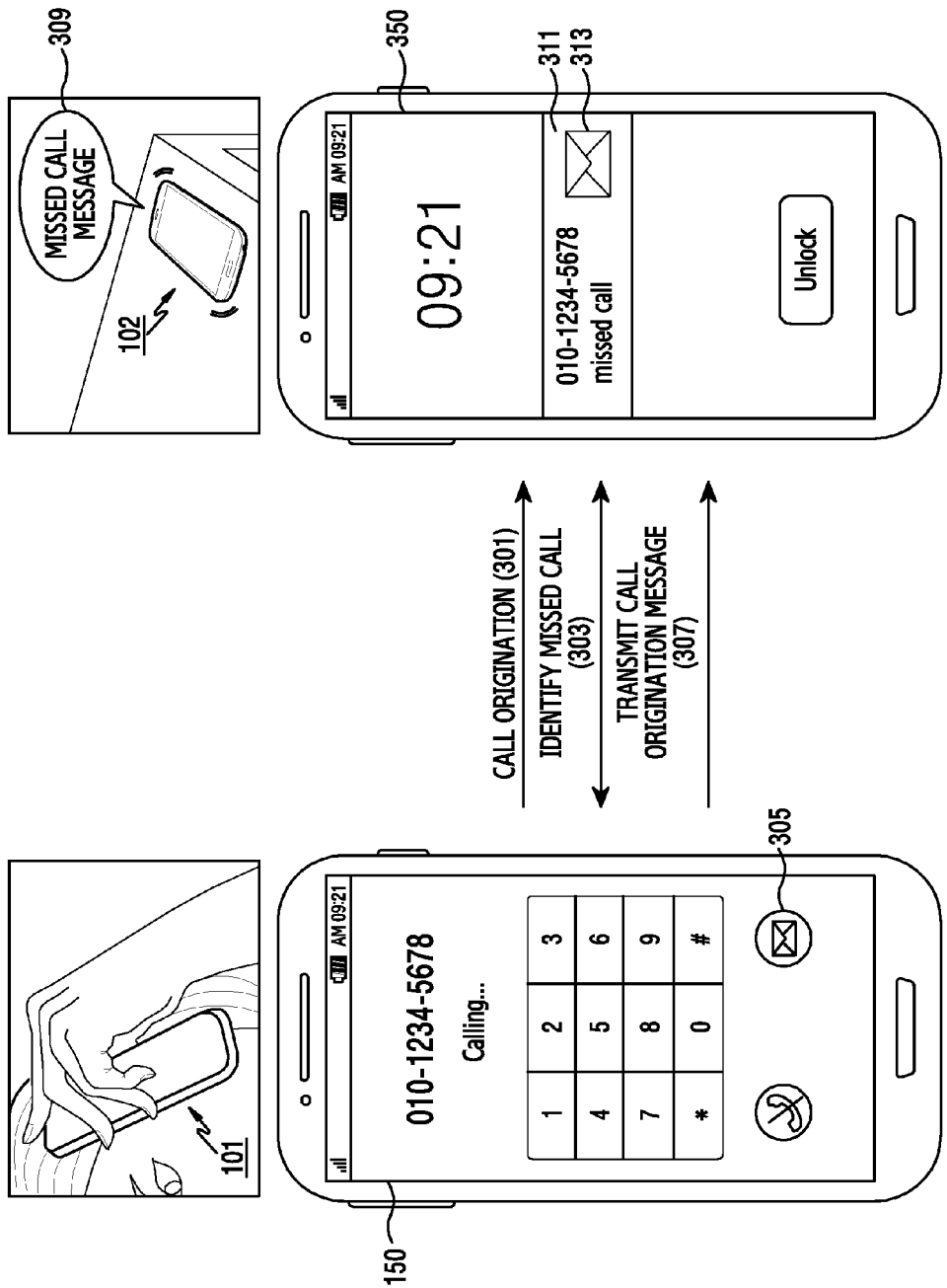
FIG. 3 illustrates a process in which an electronic device transmits a call wish message to a counterpart electronic device according to various embodiments of the present disclosure.

FIG. 3 illustrates a process in which an electronic device transmits a call wish message to a counterpart electronic device according to various embodiments of the present disclosure. According to various embodiments, the electronic device 101 may identify a call connection inability state after a call origination 301 to the counterpart electronic device (for example, the electronic device 102, hereinafter referred to as the counterpart electronic device 102). The call connection inability state after the call origination 301 may correspond to various states such as no answer of the counterpart electronic device (for example, the electronic device 102) receiving the call, call connection rejection of the counterpart electronic device 102 receiving the call, unintended (or abnormal) call end after the counterpart electronic device 102 accepts the call connection in response to the call origination 301, and power off of the counterpart electronic device 102.

For example, when the counterpart electronic device 102 does not make a signal corresponding to a call connection or call rejection within a predetermined time, the electronic device 101 may determine it as no answer of the counterpart electronic device (for example, the electronic device 102). The electronic device 101 determines that the counterpart electronic device makes no answer by receiving a signal corresponding to no answer from a relay device (for example, a base station or the server 106) that relays the call connection with the counterpart electronic device 102.

According to an embodiment, when reception of the call by the counterpart electronic device 102 after the call origination 301 ends, the electronic device 101 receives a signal corresponding to call connection rejection, and/or the electronic device 101 receives a call connection rejection message, the electronic device 101 may determine that the counterpart electronic device 102 rejects the call connection. According to an embodiment, the electronic device 101 may determine, as the call end, all states except for a state where a call end is input by a user of the electronic device 101 or a user of the counterpart electronic device 102 after the call connection with the counterpart electronic device 102 is made after the call origination 301.

For example, the call end may correspond to a state where the call ends due to a weak signal (or an instable signal) transmitted/received between the electronic device 101 and the counterpart electronic device 102 having the call connection with the electronic device 101. According to an embodiment, when the electronic device 101 receives a signal indicating that the counterpart electronic device 102 is turned off from the relay device for relaying the call with the counterpart electronic device 102 after the call origination 301, the electronic device 101 may determine that the counterpart electronic device 102 is turned off. Hereinafter, a state where the electronic device 102 cannot make a call connection with the counterpart electronic device 102 after the call origination 301 may be referred to as a call inability state of the counterpart electronic device 102.

When the electronic device 101 identifies the call inability state of the counterpart electronic device 102 after the call origination 301 as indicated by reference numeral 303, the electronic device 101 may transmit the call wish message to the counterpart electronic device 102 based on setting information. According to an embodiment, when the call origination to the counterpart electronic device 102 ends based on a user input (for example, based on an input of a command of a call origination end 304), the electronic device 101 may transmit a predetermined call wish message to the counterpart electronic device 102 as indicated by reference numeral 307.

When the electronic device 101 transmits, based on setting information, the call wish message to the counterpart electronic device 102, the electronic device 101 may transmit at least one of a predetermined user profile of the electronic device 101, a message selected based on a user input from various messages designated to setting information, and a message written based on a user input. The electronic device 101 may transmit the call wish message to the counterpart electronic device 102 through at least one of the various schemes such as a Multimedia Messaging Service (MMS), a Short Message Service (SMS), and a Long Message Service (LMS).

According to an embodiment, the counterpart electronic device 102 in the call inability state where the call connection with the electronic device 101 is not possible may display the received call wish message or notification of the call wish message. According to an embodiment, when the counterpart electronic device 102 does not respond to the call origination received from the electronic device 101 (no answer) and receives the call wish message in a state where the call connection with the electronic device 101 while the call connection with the electronic device 101 is not made, the counterpart electronic device 102 may display notification 313 of the call wish message, which corresponds to missed call notification, in a predetermined area 311 of a display 350. Alternatively, when the counterpart electronic device 102 receives the call wish message in a state where the counterpart electronic device 102 rejects the call connection in response to the received call origination or the call ends, the counterpart electronic device 102 may output the call wish message or notification of the reception of the call wish message through a predetermined scheme. For example, the electronic device 102 may output a notification message 309 through the speaker 282.

Figure 4:
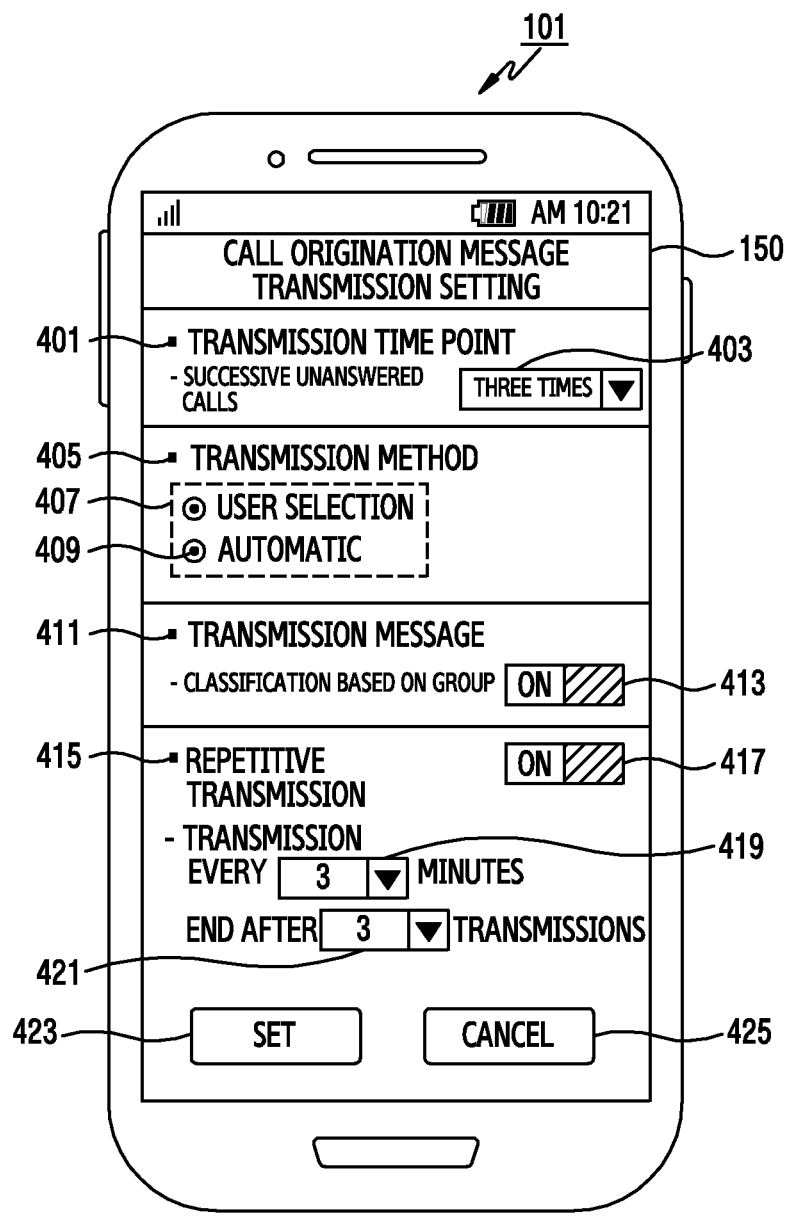
FIG. 4 illustrates a setting screen of an electronic device for transmitting a call wish message to a counterpart electronic device according to various embodiments of the present disclosure.

FIG. 4 illustrates a setting screen of the electronic device for transmitting the call wish message to the counterpart electronic device according to various embodiments of the present disclosure. According to various embodiments, the electronic device 101 may set conditions for transmitting the call wish message to the counterpart electronic device 102 in a state where the call connection with the counterpart electronic device 102 after the call origination is not possible. According to an embodiment, the electronic device 101 may provide a menu (or program) for setting the conditions for transmitting the call wish message. When the set condition is met based on a user input, a predetermined message may be transmitted to the counterpart electronic device 102 as the call wish message.

Referring to FIG. 4, based on a call wish message transmission setting environment, the electronic device 101 may set various conditions such as a call wish message transmission time point 401, a call wish message transmission scheme 405, a transmission message transmitted as the call wish message 411, and/or repetitive transmission 415.

According to an embodiment, in setting of the transmission time point 401, when the call inability state between the electronic device 101 and the counterpart electronic device 102 having received call occurs one time or successively two or more times, the electronic device 101 may set a number of times by which the call inability state occurs to transmit the call wish message. For example, when the electronic device 101 sets the transmission time point 401 such that the message is transmitted when the call inability state successively appears three times 403, if the call inability state of the counterpart electronic device 102 in response to the call origination of the electronic device 101 is successively identified three times 403, the electronic device 101 may transmit the call wish message.

According to an embodiment, when the electronic device 101 determines the transmission scheme 405, the electronic device 101 may set whether to transmit the call wish message automatically based on predetermined conditions (for example, setting information) at a time point when the call origination or the call connection ends in the call ability state of the counterpart electronic device 102 to receive the call or whether to transmit the call wish message based on a user input.

According to an embodiment, when the electronic device 101 selects a user selection 407 in the setting of the transmission scheme 405, the electronic device 101 may transmit the call wish message based on a user input at a time point when the call inability state of the counterpart electronic device 102 occurs. For example, the electronic device 101 may transmit the call to the counterpart electronic device 102 and may be in a state where a call origination interface (or a call interface) is displayed in the display 150. When the call connection is not possible, the electronic device 101 may activate a call wish message transmission menu conventionally displayed in the call origination interface of the display 150 or display the call wish message transmission menu in some of the call origination interface. When the electronic device 101 detects a user input for selecting the call wish message transmission menu displayed (or activated) in the display 150, the electronic device 101 may transmit the call wish message to the counterpart electronic device 102 or load a program (for example, a call wish message writing program) related to the call wish message.

According to an embodiment, when automatic 409 is selected in the transmission scheme 405, if the call origination or the call connection ends in the state where the call connection with the counterpart electronic device 102 is not possible after the call origination, the electronic device 101 may transmit a message designated to setting information to the counterpart electronic device 102 as the call wish message. Alternatively, when the number of times by which the call inability state is detected after the call origination meets a predetermined number of times (for example, three times), the electronic device 101 may transmit the call wish message.

According to an embodiment, the electronic device 101 may determine a transmitted call wish message according to a predetermined category of the counterpart electronic device 102 through a setting of a transmission message 411. According to an embodiment, the electronic device 101 may determine a predetermined category (or group) according to user information of the counterpart electronic device 102. For example, when the transmission message 413 is set to classification based on a group 413, if the call connection with the counterpart electronic device 102 is not possible after the call origination, the electronic device 101 may identify user information of the counterpart electronic device 102 and determine a predetermined category.

The user information may be information (for example, address book information) on the counterpart electronic device 102 stored in the electronic device 101. For example, the electronic device 101 may identify the user information of the counterpart electronic device 102 stored in the address book of the electronic device 101 based on a phone number of the counterpart electronic device 102 and also may identify a predetermined group setting of the counterpart electronic device 102 in the user information. When the call connection is not possible after the electronic device 101 transmits the call origination to the counterpart electronic device 102, the electronic device 101 may transmit a predetermined message to the counterpart electronic device 102 as the call wish message based on group information of the counterpart electronic device 102.

According to an embodiment, the electronic device 101 may determine whether to repeatedly transmit the call wish message to the counterpart electronic device 102 through a repetition setting 415. According to an embodiment, the electronic device 101 may provide a setting 417 about whether to repeatedly transmit the call wish message or not in the repetition transmission 415 of the setting environment. When the electronic device 101 determines the setting 417 as "ON", the electronic device 101 may provide a menu for determining a time interval 419 for re-transmitting the call wish message. When the call wish message is repeatedly transmitted, the electronic device 101 may provide a menu for determining the number 421 of repetitive transmissions.

For example, when the repetitive transmission in an ON state of the setting 417 is set as transmission every eight minutes 419 and three repetitive transmissions 421, if the call connection is not possible after the electronic device 101 transmits the call origination to the counterpart electronic device 102, the electronic device 101 may transmit the call wish message to the counterpart electronic device 102 at a time point when the call connection ends and may re-transmit the call wish message every eight minutes.

When the electronic device 101 identifies that the call wish message is transmitted to the counterpart electronic device 102 three times, the electronic device 101 may end the repetitive transmission of the call wish message. The electronic device 101 may store input setting information when a user input for selecting OK 423 is identified, and may end changed setting information in the setting environment without storing the changed setting information when a user input for selecting CANCEL 425 is identified.

Figure 5:
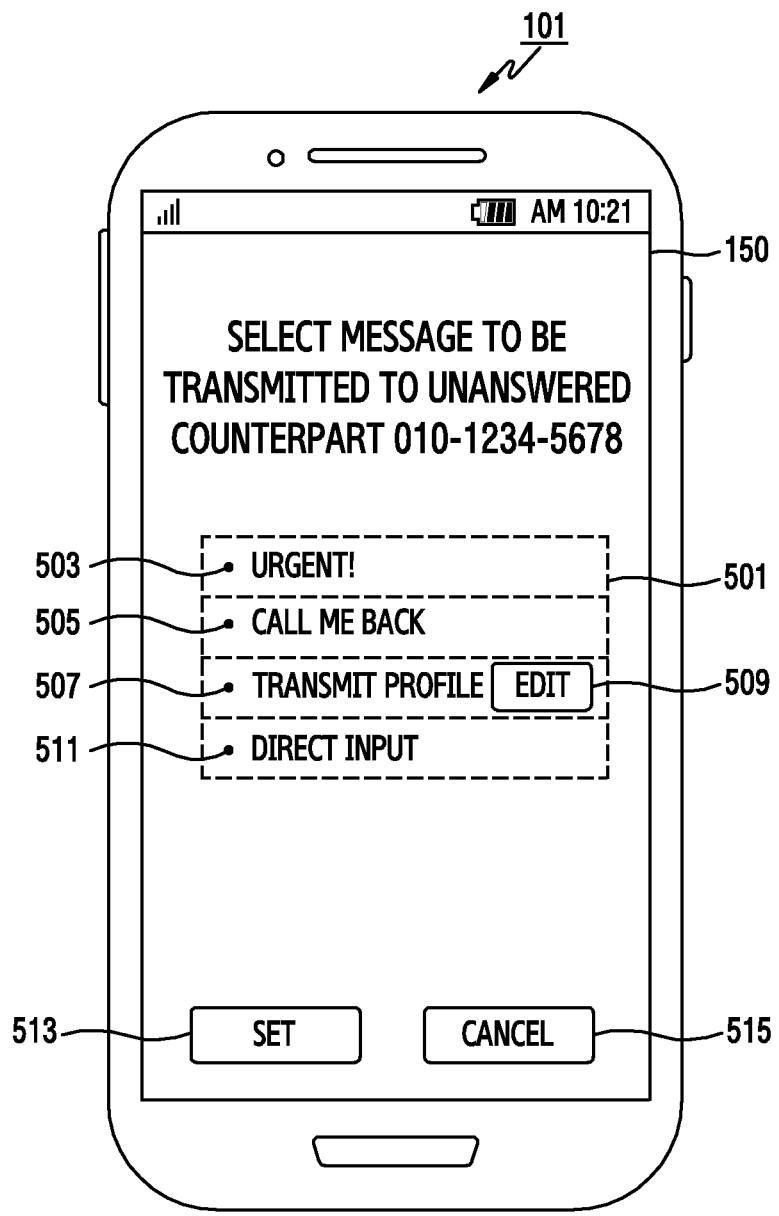
FIG. 5 illustrates a screen of an electronic device for selecting a call wish message according to various embodiments of the present disclosure.

FIG. 5 illustrates a screen of the electronic device for selecting the call wish message according to various embodiments of the present disclosure. According to various embodiments, when the call connection is not possible after the electronic device 101 transmits the call origination to the counterpart electronic device 102, the electronic device 101 may select a call wish message to be transmitted to the counterpart electronic device 102 in a state where the electronic device 101 has already determined to transmit the call wish message to the counterpart electronic device 102.

When the electronic device 101 provides the call wish message to be selected, the electronic device 101 may provide at least one preset call wish message 501 (or 505), provide a user profile 507 set to the electronic device 101 to be selected, or provide a menu for allowing a direct input 511 of the call wish message. When the electronic device 101 provides the direct input 511 of the call wish message, the electronic device 101 may allow the call wish message to be written through a voice input scheme or an image input scheme without limiting to a text input.

According to an embodiment, when the call connection is not possible after the electronic device 101 transmits the call origination to the counterpart electronic device 102, the electronic device 101 may display, on the display 150, at least one call wish message 501 which may be selected based on a user input in a state where the electronic device 101 has already determined to transmit the call wish message to the counterpart electronic device 102. For example, when the electronic device 101 detects a user input for selecting "in emergency" 503 or "call me back" 505 displayed on the display 150, the electronic device 101 may transmit the selected message to the counterpart electronic device 102 as the call wish message.

According to an embodiment, when the electronic device 101 detects a user input for selecting "profile transmission" 507 displayed on the display 150, the electronic device 101 may transmit a user profile (for example, user name, group information, and address) preset to the preset 101 to the counterpart preset 102 as the call wish message. When the electronic device 101 transmits the user profile as the call wish message, if the electronic device 101 detects a user input for selecting an EDIT 509, the user profile to be transmitted to the counterpart electronic device 102 may be changed. The electronic device 101 may transmit the changed user profile of the electronic device 101 to the counterpart electronic device 102 as the call wish message through the EDIT 509, and/or store the changed user profile.

According to an embodiment, when the electronic device 101 detects a user input for selecting the direct input 511 displayed on the display 150, the electronic device 101 may allow a user to directly input the call wish message to be transmitted to the counterpart electronic device 102. For example, when the electronic device 101 detects a user input for selecting the direct input 511, the electronic device 101 may load a message writing program to write the call wish message. The electronic device 101 may transmit the message written based on the user input to the counterpart electronic device 102 as the call wish message.

The electronic device 101 may provide a setting environment for setting at least one operation of the call connection message when OK 513 is selected, and may cancel transmission of the call wish message when CANCEL 515 is selected.

According to various embodiments, the electronic device 101 may transmit the call wish message to the counterpart electronic device 102 together with a call origination end. For example, the electronic device 101 may transmit the call wish message after ending the call origination, end the call origination after transmitting call wish message, or simultaneously transmit the call wish message and end the call origination.

Figure 6:
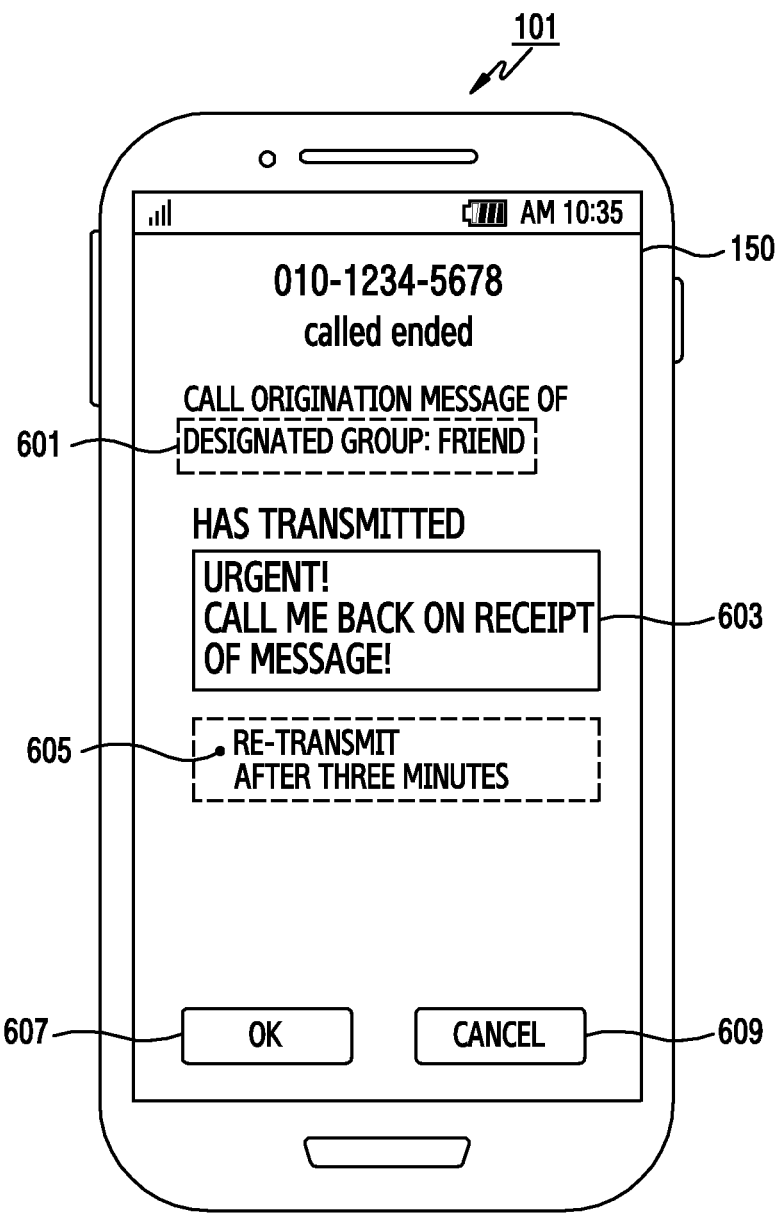
FIG. 6 illustrates a screen of an electronic device for transmitting a call wish message according to various embodiments of the present disclosure.

FIG. 6 illustrates a screen of the electronic device for transmitting the call wish message according to various embodiments of the present disclosure. According to various embodiments, when the call connection is not possible after the call origination, the electronic device 101 may display state information of the call connection message transmitted to the counterpart electronic device 102. According to an embodiment, when the electronic device 101 ends the call origination in a state where the call connection with the counterpart electronic device 102 having received the call origination is not possible, the electronic device 101 may transmit the call connection message. When the electronic device 101 transmits the call connection message, the electronic device 101 may provide state information of the transmitted call connection message (display the state information on the display 150).

For example, device identification information of the counterpart electronic device 102 (for example, phone number of the counterpart electronic device 102) having received the call origination may be stored in contacts of the electronic device 101 and a group of the counterpart electronic device 102 may be determined. When transmitting the call connection message, the electronic device 101 may transmit a predetermined message according to a group.

The electronic device 101 may determine a predetermined group (for example, friend 601) of the counterpart electronic device 102. The electronic device 101 may display a transmitted call connection message (e.g., message 603 shown in FIG. 6, for example, "Urgent! Call me on receipt of the message!") corresponding to the predetermined group on the display 150. When the call connection message is set to be re-transmitted based on setting information, the transmitted 101 may display information on the re-transmission (for example, information 605, e.g. "re-transmit after three minutes" as shown in FIG. 6) on the display 150.

According to various embodiments, in a state where state information of the transmitted call connection message is displayed on the display, the electronic device 101 may allow a user to change information corresponding to a selected item based on a user input. For example, when the electronic device 101 detects a user input for selecting a predetermined group 601, the electronic device 101 may provide a function for changing a group of the counterpart electronic device 102 stored in the contacts of the electronic device 101.

According to an embodiment, when the electronic device 101 detects a user input for selecting a message 603, the electronic device 101 may provide a function for changing a call connection message corresponding to a predetermined group (for example, friend).

According to an embodiment, when the electronic device 101 detects a user input for selecting a re-transmission setting state 605, the electronic device 101 may provide a function for changing setting information on re-transmission of the call connection message. The electronic device 101 may store changed information when OK 607 is selected, and may end without storing the changed information when CANCEL 609 is selected.

Figure 7:
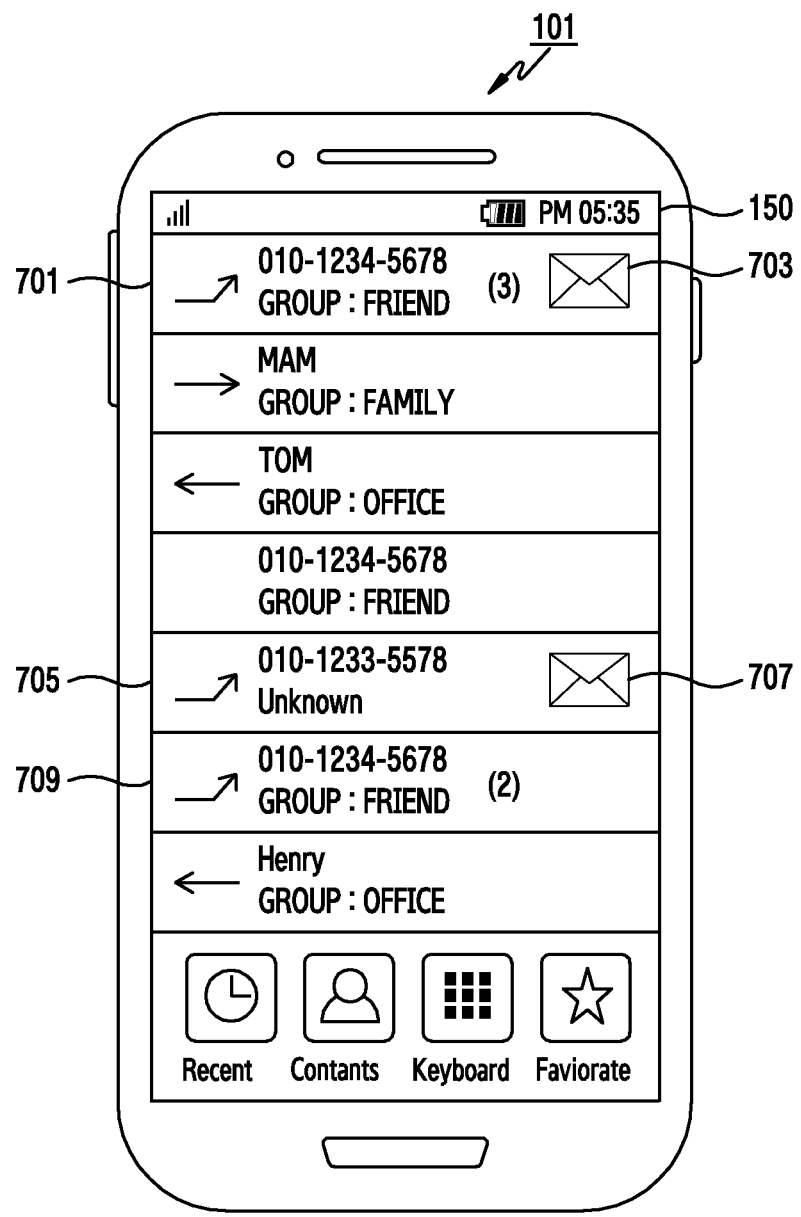
FIG. 7 illustrates a screen of tan electronic device for displaying call connection information according to various embodiments of the present disclosure.

FIG. 7 illustrates a screen of the electronic device for displaying call connection information according to various embodiments of the present disclosure. According to various embodiments, the electronic device 101 may display information of the call connection message transmitted/received to/from one or more other electronic devices (for example, the electronic device 102). According to an embodiment, when displaying call state information, the electronic device 101 may display information on a call origination, a call termination, and/or transmitted/received messages. For example, when the electronic device 101 transmits a call connection message to a first counterpart electronic device (for example, 010-1234-5678) or a second counterpart electronic device (for example, 010-1233-5678), the electronic device 101 may transmit information 703 or 707 on transmission of messages.

According to an embodiment, the electronic device 101 may set a transmission environment of the call connection message according to whether the counterpart electronic device 102 having received the call origination corresponds to a phone number stored in the contacts. For example, when the phone number of the counterpart electronic device 102 is stored in the contacts of the electronic device 101, if a call connection inability state occurs successively three or more times after the call origination, the electronic device 101 may be configured to transmit the call wish message, or when the phone number of the counterpart electronic device 102 is not stored in the contacts of the electronic device 101, if the call connection ability state occurs one or more times after the call origination, the electronic device 101 may be configured to transmit the call wish message.

For example, based on call state information displayed on the display 150 of the electronic device 101, the electronic device 101 may identify that a phone number of the first counterpart electronic device is stored in the contacts of the electronic device 101. When the call connection ability state occurs one or more times after the call origination, the electronic device 101 may count the number of times without transmitting the call wish message. When the electronic device 101 identifies that the call inability state occurs three or more times after the call origination to the first counterpart electronic device, the electronic device 101 may transmit the call wish message.

The electronic device 101 may display information 703 on transmission of the call wish message in a predetermined position of call state information 701 of the first counterpart electronic device. Based on call state information displayed on the display 150, when the call connection inability state successively occurs two times after the call origination to the first counterpart electronic device but a third call connection inability state does not occurs and thus the call connection is made, it may be identified that the call wish message is not transmitted.

When the electronic device 101 identifies that the call connection inability state occurs one time after the call origination to the second counterpart electronic device of which a phone number is not stored in the contacts of the first electronic device 101, the electronic device 101 may display information 707 of the transmitted call wish message in a predetermined position of call state information 705 of the second counterpart electronic device.

According to various embodiments, when the electronic device 101 transmits the call wish message, call state information is not limited to displaying of information on transmission of the transmitted call wish message, but information on reception of the call wish message may be displayed through call state information even when the electronic device 101 receives the call wish message from at least one counterpart electronic device 102.

Figure 8:
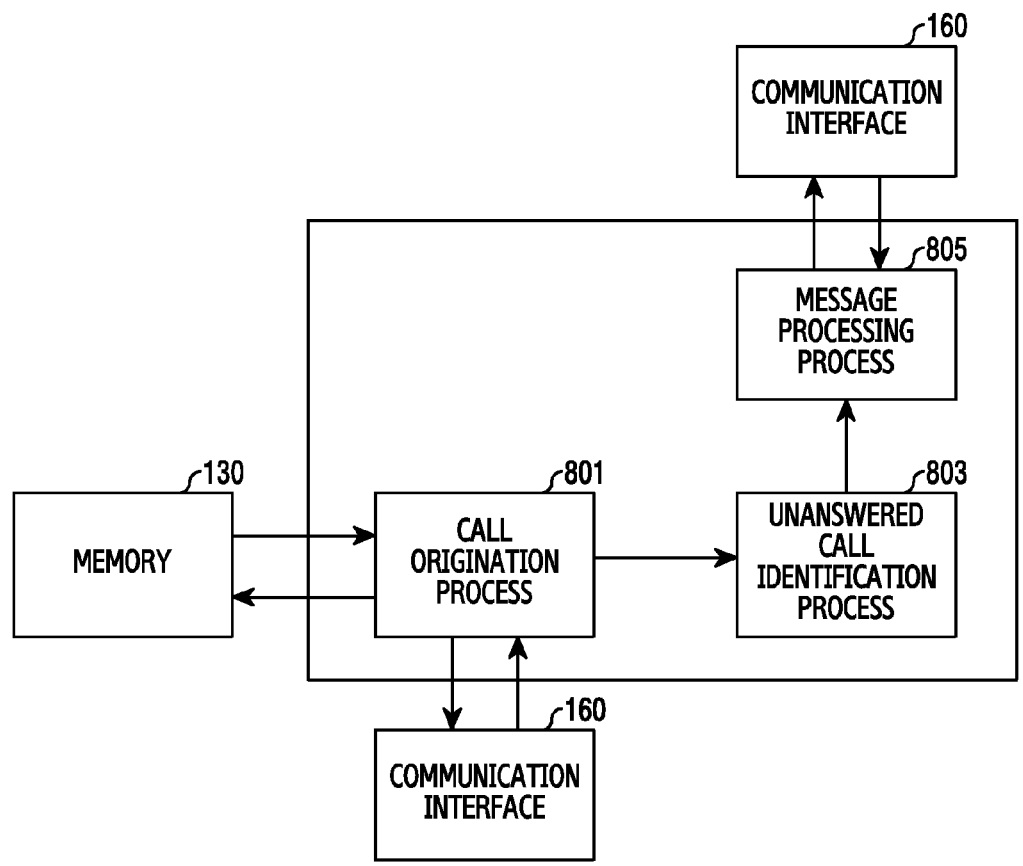
FIG. 8 is a block diagram illustrating processes executed within a processor of an electronic device according to various embodiments of the present disclosure.

FIG. 8 is a block diagram illustrating processes executed within the processor of the electronic device according to various embodiments of the present disclosure. According to various embodiments, when performing an operation of transmitting/receiving a call wish message to/from at least one counterpart electronic device 102, the electronic device 101 may perform at least one process of a call origination process 801, an unanswered call identification process 803, and a message processing process 805.

The call origination process 801 may process a call origination to one counterpart electronic device 102 through at least the communication interface 160. During the call origination process 801, an operation of transmitting a call to the counterpart electronic device 102 may be an operation of making a request for a call connection with the counterpart electronic device 102 through at least one server 106 or base station.

The unanswered call identification process 803 may identify occurrence of the call inability state (for example, unanswered state) after the call origination to the counterpart electronic device 102. When the call inability state occurs after the call origination, the unanswered call identification process 803 may count the number of times by which the call connection inability state occurs.

When the call inability state occurs after the call origination, the message processing process 805 may transmit the call wish message to the counterpart electronic device 102 based on setting information. According to an embodiment, when the number of times by which the call inability state occurs meets a predetermined number of times based on setting information, the message processing process 805 may transmit the call wish message.

The message processing process 805 may determine a call wish message to be transmitted, based on device identification information (for example, phone number) of the counterpart electronic device 102, whether the counterpart electronic device 102 is stored in the contacts of the electronic device 101, or stored group information. The electronic device 101 may transmit the call wish message to the counterpart electronic device 102 through the communication interface 160.

The processor 120 may identify the call inability state of the counterpart electronic device having received the call through the call interface and transmit the call wish message to the counterpart electronic device. The processor 120 may identify the call inability state of the counterpart electronic device having received the call based on at least one state of no answer of the counterpart electronic device, call connection rejection of the counterpart electronic device, abnormal call termination after the counterpart electronic device accepts a call connection, and power off of the counterpart electronic device 102.

According to an embodiment, the processor 120 may transmit the call wish message to the counterpart electronic device based on a user input. According to an embodiment, the processor 120 may load a call wish message transmission mode based on a user input. According to an embodiment, when the number of occurrences of the call inability state meets a predetermined number, the processor 120 may transmit the call wish message to the counterpart electronic device.

According to an embodiment, the processor 120 may automatically determine the call wish message in accordance with a group designated to information of the counterpart electronic device. According to an embodiment, the processor 120 may determine a call wish message selected from two or more provided messages or written based on a user input.

According to an embodiment, the processor 120 may display information on the transmission of the call wish message in call state information of at least one of the electronic device and the counterpart electronic device. According to an embodiment, the processor 120 may re-transmit the call wish messages by a predetermined number of times at a time interval designated to setting information. According to an embodiment, the processor 120 may insert at least some of the user profile set to the electronic device into the call wish message.

Figure 9:
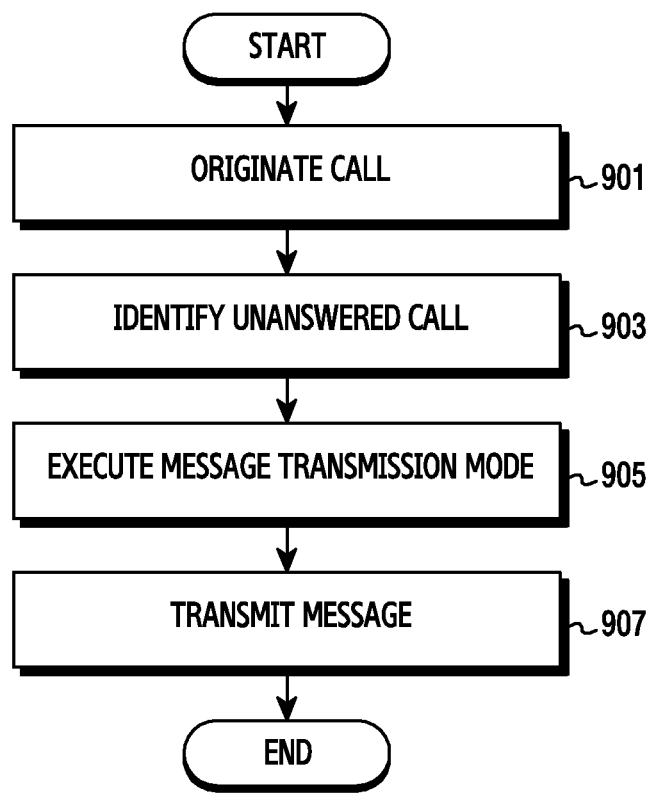
FIG. 9 is a flowchart illustrating an operation of a message transmission method by an electronic device according to various embodiments of the present disclosure.

FIG. 9 is a flowchart illustrating an operation of a message transmission method by the electronic device according to various embodiments of the present disclosure. In operation 901, the electronic device 101 may perform an operation of a call origination to the counterpart electronic device 102 based on a user input. The call origination operation may be an operation of making a request for a voice call connection to the counterpart electronic device 102 by the electronic device 101 through the communication interface 160.

In operation 903, the electronic device 101 may identify a call inability state (for example, unanswered state) occurring after the call origination operation. According to an embodiment, the electronic device 101 may identify a case where the counterpart electronic device 102 having received the call origination does not accept the call connection or a case where the call connection does not end through a normal method (for example, a call end command).

In operation 905, the electronic device 101 may load a call wish message transmission mode. According to an embodiment, the electronic device 101 may determine whether to transmit the call wish message to the counterpart electronic device 102 based on setting information and also determine a message to be transmitted.

According to an embodiment, the electronic device 101 may determine whether to transmit the call wish message to the counterpart electronic device 102 based on the number of times by which the call inability state occurs after the call origination, and determine a preset message as the call wish message based on setting information or determine the call wish message based on a user input. The electronic device 101 may display at least one message or a function for determining a message on the display 150 and determine the call wish message to be transmitted based on a user input.

In operation 907, the electronic device 101 may transmit the determined message to the counterpart electronic device 102. In transmission of the call wish message to the counterpart electronic device 102, the electronic device 101 may re-transmit the call wish message based on preset information. According to an embodiment, the electronic device 101 may transmit the call wish message at a predetermined time interval (for example, every seven minutes) by a predetermined number of times (for example, three times) based on the setting information. The electronic device 101 may end the embodiment of FIG. 9 after performing operation 907.

Figure 10:
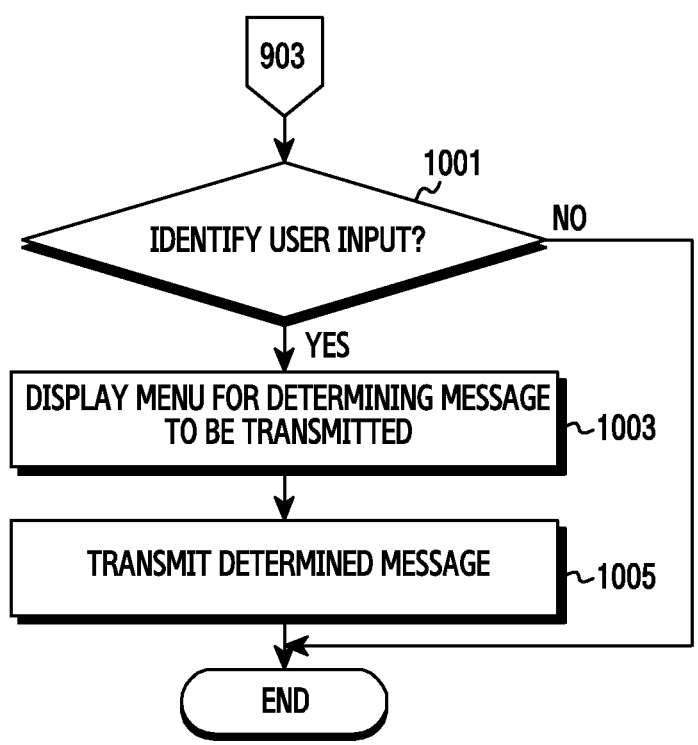
FIG. 10 is a flowchart illustrating partial operations for determining a call wish message to be transmitted based on a user input in a message transmission method by an electronic device according to various embodiments of the present disclosure.

FIG. 10 is a flowchart illustrating partial operations for determining the call wish message to be transmitted based on a user input in a message transmission method by an electronic device, according to various embodiments of the present disclosure. According to various embodiments, the electronic device may determine the call wish message to be transmitted to the counterpart electronic device 102 according to a call inability state occurring after the call origination to the counterpart electronic device 102. According to an embodiment, operation 1001 may be an operation performed after the call inability state is identified in operation 903.

In operation 1001, the electronic device 101 may determine whether to perform a function of transmitting the call wish message (or a call wish message transmission mode). According to an embodiment, the electronic device 101 may determine whether to transmit the call wish message based on a user input in the call inability state occurring after the call origination to the counterpart electronic device 102.

For example, when the electronic device 101 selects a call wish message transmission icon provided in the call inability state, the call wish message transmission mode may be loaded. The electronic device 101 may perform operation 1003 when a user input for transmitting the call wish message is identified, and may end the embodiment of FIG. 10 when the user input for transmitting the call wish message is not identified.

In operation 1003, the electronic device 101 may provide the call wish message to be transmitted. According to an embodiment, when the call wish message transmission mode is loaded, the electronic device 101 may display at least one predetermined message on the display 150 based on setting message. In addition, the call wish message is not limited to the predetermined message, and the electronic device 101 may provide a message writing program by which the call wish message can be input based on a user input.

In operation 1005, the electronic device 101 may transmit the determined call wish message to the counterpart electronic device 102. According to an embodiment, in transmission of the determined call wish message, the electronic device 101 may re-transmit the call wish message to the counterpart electronic device 102 based on setting information. The electronic device 101 may end the embodiment of FIG. 10 after performing operation 1005.

Figure 11:
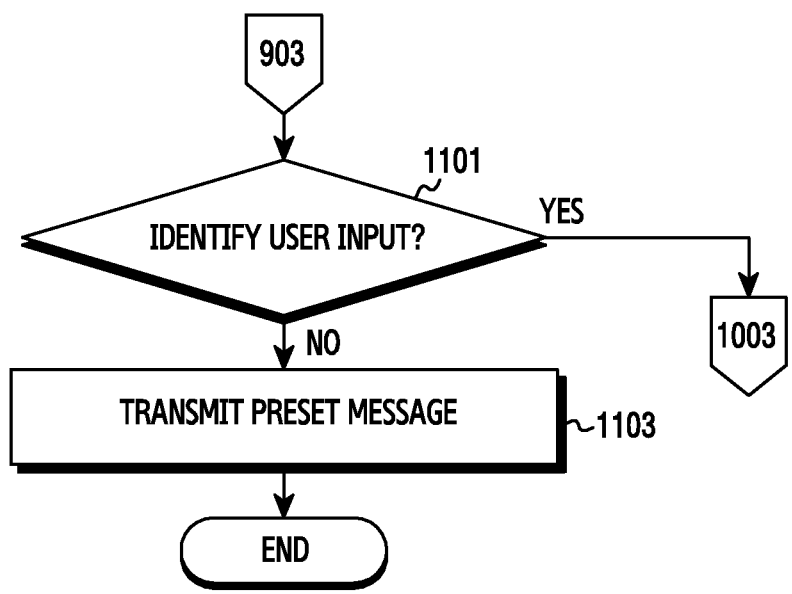
FIG. 11 is a flowchart illustrating partial operations for transmitting a predetermined call wish message in a message transmission method by an electronic device according to various embodiments of the present disclosure.

FIG. 11 is a flowchart illustrating partial operations for transmitting a predetermined call wish message in a message transmission method by an electronic device according to various embodiments of the present disclosure. According to various embodiments, the electronic device 101 may transmit a predetermined message to the counterpart electronic device 102 as the call wish message based on information on the counterpart electronic device 102 having received the call, which is stored in the electronic device 101. According to an embodiment, operation 1101 may be an operation performed after the call inability state is identified in operation 903.

In operation 1101, the electronic device 101 may determine whether to perform a function of transmitting the call wish message (or a call wish message transmission mode).

According to an embodiment, the electronic device 101 may determine whether to transmit the call wish message based on a user input in the call inability state occurring after the call origination to the counterpart electronic device 102.

For example, when the electronic device 101 selects a call wish message transmission icon provided in the call inability state, the call wish message transmission mode may be loaded. The electronic device 101 may perform operation 1103 when a user input for transmitting the call wish message is identified, and may end the embodiment of FIG. 11 or may perform operation 1003 of FIG. 10 when the user input for transmitting the call wish message is not identified.

In operation 1103, the electronic device 101 may transmit a preset message. In other words, the predetermined call wish message may be transmitted based on setting information. According to an embodiment, the electronic device 101 may identify a phone number of the counterpart electronic device 102 stored in contacts of the electronic device 101 and may determine predetermined group information of the counterpart electronic device 102.

The electronic device 101 may determine a predetermined call wish message corresponding to group information based on setting information and determine a number of re-transmissions of the call wish message and/or a time interval at which the call wish message is re-transmitted. The electronic device 101 may determine the determined call wish message at a predetermined time interval by a predetermined number of times. The electronic device 101 may end the embodiment of FIG. 11 after performing operation 1103.

Figure 12:
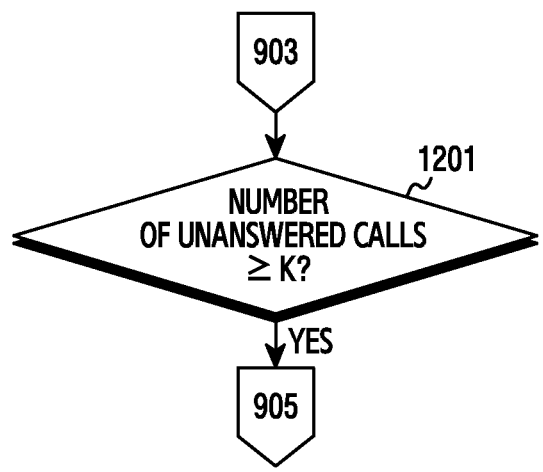
FIG. 12 is a flowchart illustrating partial operations for transmitting a call wish message based on a predetermine condition in a message transmission method by an electronic device according to various embodiments of the present disclosure.

FIG. 12 is a flowchart illustrating partial operations for transmitting the call wish message based on a predetermine condition in a message transmission method by an electronic device according to various embodiments of the present disclosure. According to various embodiments, the present disclosure is not limited to the method in which the electronic device 101 loads the call wish message transmission mode based on the user input and transmits the call wish message. When a predetermined condition is met based on setting information, the electronic device 101 may load the call wish message transmission mode. According to an embodiment, operation 1201 may be an operation performed after the call inability state is identified in operation 903.

In operation 1201, the electronic device 101 may count a number of times by which the call inability state successively occurs after the call origination to the counterpart electronic device 102. When the call inability state between the electronic device 101 and the counterpart electronic device 102 successively occurs by a preset number of times (K) or more in setting information, the electronic device 101 may automatically transmit the call wish message to the counterpart electronic device 102.

According to an embodiment, the electronic device 101 may determine the call wish message based on whether identification information (for example, a phone number) of the counterpart electronic device 102 is stored in the contacts of the electronic device 101 or based on group information of the counterpart electronic device 102. After the performance of operation 1201, the electronic device 101 may end the embodiment of FIG. 12 or may perform operation 907 of FIG. 9.

According to various embodiments, an operation method of the electronic device may include an operation for identifying a call inability state of the counterpart electronic device having received the call and an operation for transmitting the call wish message to the counterpart electronic device. According to an embodiment, the operation for identifying the call inability state of the counterpart electronic device having received the call may include an operation for identifying at least one of no answer of the counterpart electronic device, call connection rejection of the counterpart electronic device, abnormal call end after the counterpart electronic device accepts a call connection, and power off of the counterpart electronic device 102.

According to an embodiment, the operation for transmitting the call wish message to the counterpart electronic device may further include an operation for transmitting the call wish message based on a user input. According to an embodiment, the operation for transmitting the call wish message to the counterpart electronic device may further include an operation for loading a call wish message transmission mode based on a user input.

According to an embodiment, the operation for transmitting the call wish message to the counterpart electronic device may be performed when a number of times, by which a call inability state occurs, meets a predetermined number of times. According to an embodiment, the call wish message may be automatically determined in accordance with a group designated to information of the counterpart electronic device. According to an embodiment, the call wish message may be selected from two or more provided messages or written based on a user input.

According to an embodiment, the operation method may further include an operation for displaying information on transmission of the call wish message in call state information of at least one of the electronic device and the counterpart electronic device. According to an embodiment, the operation method may further include an operation for re-transmitting the call wish message at a predetermined time interval in setting information by a predetermined number of times. According to an embodiment, the call wish message may include at least some of a user profile set to the electronic device.

Various embodiments performed by the electronic device 101 may be operations performed by a control of the processor 120. In addition, the electronic device 101 may include a module separate from the processor 120, which may be programmed to control various embodiments of the present disclosure. The separate module programmed to control the various embodiments of the present disclosure may operate under a control of the processor 120.

Each of the above-described elements of the electronic device according to various embodiments of the present disclosure may include one or more components, and the name of a corresponding element may vary according to the type of electronic device. The electronic device according to various embodiments of the present disclosure may include at least one of the above described elements and may exclude some of the elements or further include other additional elements. Further, some of the elements of the electronic device according to various embodiments of the present disclosure may be coupled to form a single entity while performing the same functions as those of the corresponding elements before the coupling.

According to various embodiments of the present disclosure, at least some of the devices or methods according to various embodiment of the present disclosure as defined by the appended claims and/or disclosed herein may be implemented in the form of hardware, software, firmware, or any combination (e.g., module or unit) of at least two of hardware, software, and firmware. The "module" may be interchangeably used with, for example, the term "unit", "logic", "logical block", "component", or "circuit". The "module" may be a minimum unit of an integrated component element or a part thereof.

The "module" may be the smallest unit that performs one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations, which may be known or is to be developed.

If implemented in software, a computer-readable storage medium (or storage medium readable by a computer) storing at least one program (or programming module) may be provided. The software may, for example, be implemented by instructions stored in a computer-readable storage medium in the form of a programming module. The at least one program may include instructions that cause the electronic device to perform the methods according to various embodiments of the present disclosure as defined by the appended claims and/or disclosed herein. When the command is executed by one or more processors (for example, the processor 120), the one or more processors may execute a function corresponding to the command. The computer-readable storage medium may, for example, be the memory 230.

At least a part of the programming module may, for example, be implemented (e.g., executed) by the processor 220. At least a part of the programming module may, for example, include a module, a program, a routine, a set of instructions, or a process for performing at least one function.

The computer-readable storage medium may include magnetic media such as a hard disc, a floppy disc, and a magnetic tape; optical media such as a compact disc read only memory (CD-ROM) and a digital versatile disc (DVD); magneto-optical media such as a floptical disk; a hardware device specifically configured to store and execute program instructions (e.g., programming module), such as a read only memory (ROM), a random access memory (RAM), and a flash memory; an electrically erasable programmable read only memory (EEPROM); a magnetic disc storage device; any other type of optical storage device; and a magnetic cassette.

Alternatively, any combination of some or all of the may form a memory in which the program is stored. Further, a plurality of such memories may be included in the electronic device. In addition, the program instructions may include high class language codes, which can be executed in a computer by using an interpreter, as well as machine codes made by a compiler.

According to various embodiments, the electronic device 101 may include a computer-readable storage medium having a program stored therein to perform an operation for identifying a call inability state of the counterpart electronic device having received the call and an operation for transmitting the call wish message to the counterpart electronic device.

In addition, the program may be stored in an attachable storage device capable of accessing the electronic device through a communication network such as the Internet, an intranet, a local area network (LAN), a wide LAN (WLAN), a storage area network (SAN), or any combination thereof. Such a storage device may access the electronic device via an external port. Further, a separate storage device on the communication network may access a portable electronic device. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

Meanwhile, the exemplary embodiments disclosed in the specification and drawings are merely presented to easily describe technical contents of the present disclosure and help the understanding of the present disclosure and are not intended to limit the scope of the present disclosure. Therefore, all changes or modifications derived from the technical idea of the present disclosure as well as the embodiments described herein should be interpreted to belong to the scope of the present disclosure.

What is claimed is:

1. An electronic device comprising:
   a communication interface; and
   a processor operatively coupled to the communication interface, the processor configured to:
   determine a plurality number of times regarding try of a call connection with a counterpart electronic device,
   transmit a signal for the call connection to the counterpart electronic device for a number of times, and
   if the number of times reaches the plurality number of times, transmit a message for requesting a response for the signal to the counterpart electronic device.

2. The electronic device of claim 1, wherein the processor is further configured to determine that the call connection with the counterpart electronic device is unestablished, based on at least one detection of no reply from the counterpart electronic device, call connection rejection, abnormal call termination after a call connection, and power off.

3. The electronic device of claim 1, further comprising:
   a display unit,
   wherein the processor is configured to, if the message transmission is determined, control the display unit to display the message, and transmit the displayed message to the counterpart electronic device based on a user input, and
   wherein the message is generated before transmitting the signal to the counterpart electronic device.

4. The electronic device of claim 1, wherein the processor is configured to load a message transmission mode for transmitting the message to the counterpart electronic device.

5. The electronic device of claim 1, wherein the processor is configured to transmit the message to the counterpart electronic device, if the number of times is equal to a predetermined number of times.

6. The electronic device of claim 1, further comprising:
   a memory configured to store a plurality of messages related to the call connection, and
   wherein the processor is configured to select one message among the plurality of messages based on a group to which a user of the counterpart electronic device belongs, transmit the selected message to the counterpart electronic device.

7. The electronic device of claim 1, further comprising:
   a display unit,
   wherein the processor is configured to, if transmission of the message is determined, control the display unit to display a plurality of message related to the call connection, select one message among the plurality of messages based on a user input, transmit the selected message to the counterpart electronic device.

8. The electronic device of claim 1, further comprising:
a display unit,
wherein the processor is configured to control the display unit to display history information on transmission of the message.

9. The electronic device of claim 1, wherein the processor is configured to re-transmit the message according to at least one of a predetermined time interval and a predetermined number of times.

10. The electronic device of claim 1, wherein the message includes at least some of a user profile set to the electronic device.

11. A method of operating an electronic device, the method comprising:
determining a plurality number of times regarding try of a call connection with a counterpart electronic device;
transmitting a signal for the call connection to the counterpart electronic device for a number of times; and
if the number of times reaches the plurality number of times, transmitting a message for requesting a response for the signal to the counterpart electronic device.

12. The method of claim 11, further comprising determining that the call connection with the counterpart electronic device is unestablished based on at least one detection of no reply from the counterpart electronic device, call connection rejection, abnormal call termination after a call connection, and power off.

13. The method of claim 11, wherein the transmitting the message comprises:
displaying the message; and
transmitting the displayed message to the counterpart electronic device based on a user input,
wherein the message is generated before transmitting the signal to the counterpart electronic device.

14. The method of claim 11, further comprising loading a message transmission mode for transmitting the message to the counterpart electronic device.

15. The method of claim 11, wherein the transmitting the message comprises transmitting the message to the counterpart electronic device if the number of times is equal to a predetermined number of times.

16. The method of claim 11, wherein the transmitting the message comprising:
selecting one message among the plurality of messages related to the call connection, based on a group to which a user of the counterpart electronic device belong; and
transmitting the selected one message to the counterpart electronic device.

17. The method of claim 11, wherein the transmitting the message comprising:
displaying a plurality of message related to the call connection;
selecting one message among the plurality of messages based on a user input; and
transmitting the selected message to the counterpart electronic device.

18. The method of claim 11, further comprising:
displaying history information on the transmitting of the message.

19. The method of claim 11, further comprising re-transmitting the message according to at least one of a predetermined time interval and a predetermined number of times.

20. The method of claim 11, wherein the message includes at least some of a user profile set to the electronic device.

* * * * *